United States Patent [19]
Swartz

[11] Patent Number: 5,448,046
[45] Date of Patent: Sep. 5, 1995

[54] ARRANGEMENT FOR AND METHOD OF EXPEDITING COMMERCIAL PRODUCT TRANSACTIONS AT A POINT-OF-SALE SITE

[75] Inventor: Jerome Swartz, Old Field, N.Y.

[73] Assignee: Symbol Technologies, Inc., Bohemia, N.Y.

[21] Appl. No.: 292,584

[22] Filed: Aug. 18, 1994

Related U.S. Application Data

[63] Continuation-in-part of Ser. No. 921,414, Jul. 27, 1992, abandoned, which is a continuation of Ser. No. 553,559, Jul. 16, 1990, abandoned, which is a continuation-in-part of Ser. No. 392,207, Aug. 10, 1989, abandoned, which is a continuation-in-part of Ser. No. 138,563, Dec. 28, 1987, Pat. No. 4,871,904.

[51] Int. Cl.⁶ .................................................. G06F 3/12
[52] U.S. Cl. .................. 235/432; 235/383; 235/433; 235/462; 235/472
[58] Field of Search ............... 235/383, 432, 433, 462, 235/472

[56] References Cited

U.S. PATENT DOCUMENTS

| | | | |
|---|---|---|---|
| 4,377,741 | 3/1983 | Brekka et al. | 235/472 |
| 4,440,248 | 4/1984 | Teraoka | 235/462 X |
| 4,630,067 | 12/1986 | Teraoka | 235/432 X |
| 4,706,095 | 11/1987 | Ono et al. | 235/432 X |
| 4,706,096 | 11/1987 | Sato | 235/432 X |
| 4,734,710 | 3/1988 | Sato et al. | 235/432 X |
| 4,766,297 | 8/1988 | McMillan | 235/455 |

FOREIGN PATENT DOCUMENTS

| | | |
|---|---|---|
| 2163581 | 2/1986 | United Kingdom . |
| 2178921 | 2/1987 | United Kingdom . |

OTHER PUBLICATIONS

Symbol Monograph Series, Quick Response: A Better Way—Monograph 3, "Shelf Price Audit/Price Verification", Mar. 1990, p. 33.

The Wireless Store, The Strategic Environment for Retailing's Future, Jan. 1992, pp. 1–30.

Primary Examiner—John Shepperd
Assistant Examiner—Steven Wigmore
Attorney, Agent, or Firm—Kirschstein, et al.

[57] ABSTRACT

A method of and arrangement for updating inventory markings include printing an updated label containing updated information such as price obtained from the data base of a host computer on a real-time basis, The updated label is applied to a product identified by a scanner,

15 Claims, 5 Drawing Sheets

ARRANGEMENT FOR AND METHOD OF EXPEDITING COMMERCIAL PRODUCT TRANSACTIONS AT A POINT-OF-SALE SITE

CROSS REFERENCE TO RELATED APPLICATIONS

This application is a continuation-in-part of U.S. patent application Ser. No. 07/921,414, filed Jul. 27, 1992, now abandoned, which, in turn, is a continuation of U.S. patent application Ser. No. 07/553,559, filed Jul. 16, 1990, now abandoned, which, in turn, is a continuation-in-part of U.S. patent application Ser. No. 07/392,207, filed Aug. 10, 1989, now abandoned which, in turn, is a continuation-in-part of U.S. patent application Ser. No. 07/138,563, filed Dec. 28, 1987, now U.S. Pat. No. 4,871,904. This application is related to U.S. patent application Ser. No. 07/966,906, filed Oct. 22, 1992, now abandoned, which is a continuation of U.S. patent application Ser. No. 07/553,558, filed Jul. 16, 1990, now abandoned.

BACKGROUND OF THE INVENTION

1. Field of the Invention

This invention generally relates to an arrangement for and a method of updating inventory markings and, more particularly, to a point-of-sale (POS) system including a scanner for electro-optically scanning a target, e.g., a bar code symbol on a label applied to a product; a terminal such as a data base computer or cash register operative for storing information, e.g., price, relating to the product, and for periodically updating such information; and a printer for printing an updated label for such updated information.

2. Description of Related Art

Targets having indicia of different light reflectivity, such as bar code symbols printed on labels affixed to products, have been electro-optically scanned by directing laser beams to symbols for reflection therefrom. A portion of the reflected laser beam for each symbol was collected by a photodetector having a finite field of view. Each symbol and/or the field of view was scanned by different scan patterns including, but not limited to, a single scan line, a set of generally parallel scan lines, two sets of intersecting parallel scan lines, multiple intersecting scan lines, Lissajous scan patterns, holographic scan patterns, omnidirectional scan patterns, etc.

POS scanners and readers of this general type for electro-optically reading symbols have been disclosed, for example, in U.S. Pat. Nos. 4,251,798; 4,360,798; 4,369,361; 4,387,297; 4,593,186; 4,496,831; 4,409,470; 4,460,120; 4,607,156; 4,673,805; 4,736,095; 4,758,717; 4,760,248; 4,806,742; 4,808,804; 4,825,057; 4,816,661; 4,816,660; 4,845.,350; 4,835,374; 4,871,904; D-306,434; D-306,435; as well as pending applications Serial Nos. 193,265; 265,143; 265.,548; 265,149; 264,693; 367,335; 367,007; 429,198; 392,207; and 349,860, all of the aforementioned patents and patent applications having been assigned to the same assignee as the instant application, and being hereby incorporated herein by reference.

Once a product having a symbol-bearing label has been scanned and identified, information such as price relating to the identified product is retrieved from a data base of a host computer. This information is then used, for example, at a supermarket checkout counter to indicate the price of the identified product to a customer.

Although generally satisfactory for its intended purpose, some customers wish to know the price of a product before standing in line at the checkout counter. To assist the customer, some stores post price signs in the vicinity of the products for sale on supermarket shelves. However, those signs are sometimes removed and not replaced on the shelves. More often, the price information is outdated from one day to the next due to price increases or special promotion sales. The only reliable price information is obtained typically only at the checkout counter and, as previously noted, many customers would like to know the price beforehand.

SUMMARY OF THE INVENTION

1. Objects of the Invention

It is a general object of-this invention to advance the state of the art of such scanners.

It is another object of this invention to update inventory markings on a real-time basis.

Another object of this invention is to print updated product labels when information relating to the product has been updated.

A further object of this invention is to print individual updated product labels for application to each product.

Still another object of this invention is to advise a customer of the price of a product prior to checkout.

2. Features of the Invention

In keeping with these objects, and others which will become apparent hereinafter, one feature of this invention resides, briefly stated, in a method of and an arrangement for updating inventory markings. The invention includes storing information relating to inventory products in a data base of a host computer, and periodically updating such information relating to the products as circumstances, e.g. price increases or decreases, warrant. Each of the products is identified by electro-optically reading indicia thereon having parts of different light reflectivity. In a preferred embodiment, the indicia are bar code symbols printed on labels affixed to the products.

Each time a product has been identified, the host computer is interrogated on a real-time basis for the updated information. If updated information is available, an updated label is printed, the updated label containing the updated information in human-readable and/or machine-readable form. The updated label is thereupon applied to the identified product.

Thus, when the information relating to the products is price information, the customer is reliably apprised of the actual price of the item prior to checkout. No longer need the customer be faced with missing price signs.

The electro-optical reading of the symbol is preferably performed by a hand-held head supported by a retail clerk, and aimable at each symbol during reading. Within the head are mounted means for directing a light beam, preferably a laser beam, to the symbol, means for detecting at least a portion of light of variable intensity reflected off each symbol over a field of view, means for scanning at least one of said laser beam and said field of view, and means for processing electrical signals indicative of the detected light intensity into data identifying the product bearing the symbol.

Rather than a hand-held head, all of the aforementioned means can be incorporated in a head of a desktop, stand-alone workstation. The head may be connected, in a preferred embodiment, to one end of an arm that is bendable in order to position the head in a desired orientation.

The printing of the updated label may be performed by a printer on-board the head, or located remotely therefrom, e.g. a portable printer either held separately by the clerk or supported on a belt or shoulder strap worn by the clerk.

In a preferred embodiment the printer is a thermal printer that is powered by a re-usable, rechargeable battery. The printer advantageously prints on leading portions of a paper roll of tear-off labels not only the aforementioned price information, but also sequence numbers indicative of the number of times that the printer has printed labels—a feature useful in preventing pilferage.

The electro-optical reading of a bar code symbol uniquely associated with each product insures that incorrect product identification by manual entry of an incorrect numerical code at a keyboard is reliably prevented.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
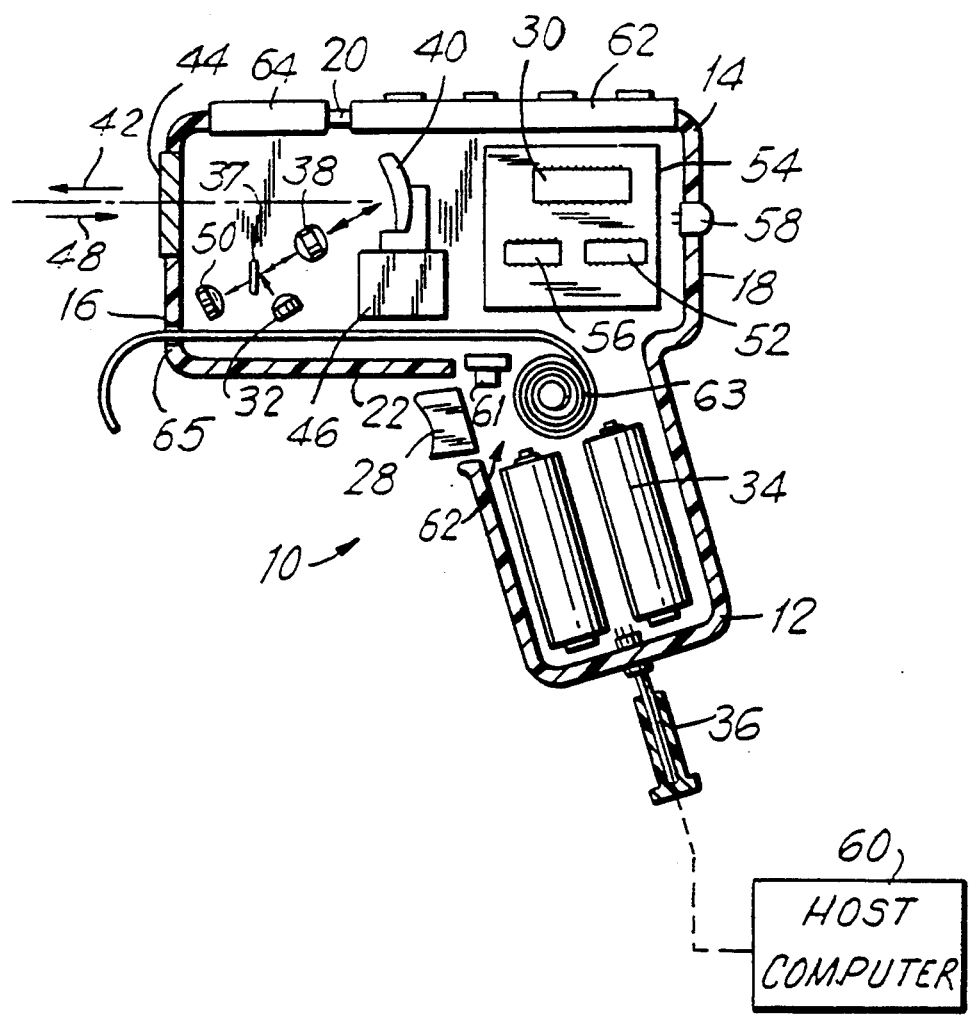
FIG. 1 is a sectional view of a hand-held head together with a host computer for use in the present invention.

Referring now to FIG. 1 of the drawings, reference numeral 10 generally identifies a lightweight (less than 1 lb.), narrow-bodied, streamlined, hand-held, fully-portable, easy-to-manipulate, non-arm-and wrist-fatiguing, scanning head supportable entirely by an operator for use in a scanning system operative for reading, scanning and/or analyzing symbols, and aimable, both prior to and during reading thereof, by the operator at the symbol, each symbol in its turn. The term "symbol" as used herein is intended to cover indicia composed of parts having different light-reflective properties. The indicia may be industrial symbols, e.g. Code 30, Codabar, Interleaved 2 or 5, etc., or the omnipresent Universal Product Code (UPC) bar code symbol. The indicia may also be composed of alphabetic and/or numeric characters.

The head 10 includes a generally gun-shaped housing having a handle portion 12 of generally rectangular cross-section, and a generally horizontally-elongated, narrow bodied barrel or body portion 14. The dimensions and overall size of the handle portion 12 are such that the head 10 can conveniently fit and be held in the operator's hand. The body and handle portions are constituted of a light weight, resilient, shock-resistant, self-supporting material such as a synthetic plastic material. The plastic housing is preferably injection-molded and forms a thin, hollow shell whose interior space measures less than a volume on the order of 50 cu.in.

Figure 2:
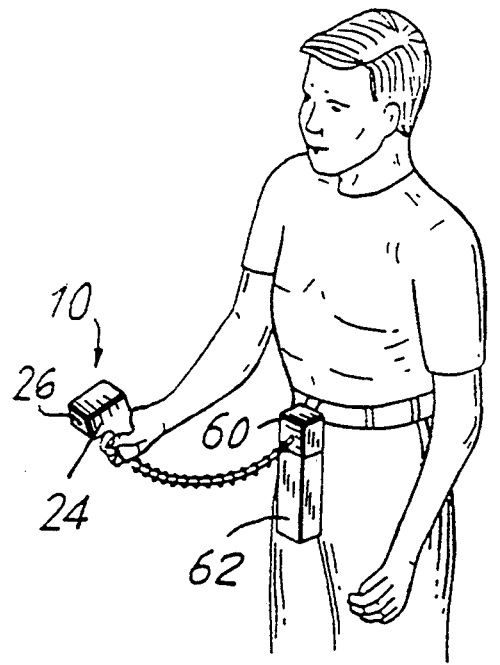
FIG. 2 is a perspective view of the arrangement of FIG. 1 in use.

As considered in an intended position of use, as shown in FIG. 2, the body portion 14 has a front wall 16, a rear wall 18 spaced rearwardly of the front wall, a top wall 20, a bottom wall 22 below the top wall, and a pair of opposed side walls 24, 26 that lie in mutual parallelism between the top and bottom walls.

A manually-actuatable, and preferably depressible, trigger 28 is mounted for pivoting movement about a pivot axis on the head in a forwardly-facing region where the handle and body portions meet and where the operator's forefinger normally lies when the operator grips the handle portion in the intended position of use.

A plurality of components are mounted in the head and, as explained below, at least some of them are actuated by the trigger 28, either directly or indirectly, by means of a control microprocessor 30. One of the head components is an actuatable light source, e.g. a semiconductor laser diode 32 or a light emitting diode, operative, when actuated by the trigger 28, for propagating and generating an incident light beam. In the case of a laser, the light beam is highly divergent, is non-radially symmetrical, is generally oval in cross-section, and has a wavelength above 7000 Angstrom units. The laser diode 32 may be of the continuous wave or pulse type. The diode 32 requires a low voltage, e.g. 12 volts DC or less, supplied by a battery 34 which may be provided within the handle portion 12 or by a rechargeable battery pack accessory detachably mounted on the head, or by a power conductor in a cable connected to the head from an external power supply.

An optical assembly, including a half-silvered mirror 37 and an optical train 38, is mounted in the head, and is adjustably positioned relative to the diode 32 for optically modifying and directing the incident laser beam along a first optical path toward a reference plane which is located exteriorly of the head forwardly of the front wall 16 and which lies generally perpendicular to the longitudional direction along which the incident laser beam propagates. A symbol to be read is located at the vicinity of the reference plane, either at or at one side, or at an opposite side, of the reference plane, that is, anywhere within the depth of focus or field of the optically-modified incident laser beam. The depth of focus or field is also known as the working distance in which the symbols can be read. The incident laser beam reflects off each symbol in many directions, and that portion of the reflected laser light which travels away from the symbol back toward the head is known herein as the returning portion.

The laser beam passing through the optical train 38 impinges on a generally planar portion of a scanning mirror 40 for reflection therefrom. The scanning mirror 40 forwardly reflects the laser beam impinging thereon in the direction of an arrow 42 through a forwardly-facing light-transmissive window 44 mounted on the front wall 16 and to the symbol.

The scanning mirror 40 is mounted on a scanning component, preferably a high-speed scanner motor 46 of the type shown and described in U.S. Pat. No. 4,387,397, the entire contents of which are incorporated herein by reference. For purposes of this application, it is sufficient to point out that the motor 46 has an output shaft on which a support bracket is fixedly mounted. The scanning mirror 40 is fixedly mounted on the bracket and is driven in alternate circumferential directions over arc lengths of any desired size, typically less than 360°, and at a rate of speed on the order of a plurality of oscillations per second. In a preferred embodiment, the scanning mirror 40 and the shaft are reciprocally and repetitively oscillated so that the scanning mirror repetitively sweeps the incident laser beam impinging on the mirror through an angular distance or arc length at the reference plane of about 32° and at a rate of about 20 scans or 40 oscillations per second.

The returning portion of the reflected laser light has a variable light intensity due to the different light-reflective properties of the various parts that comprise the symbol over the symbol during the scan. The returning portion of the reflected laser light is collected in the direction of arrow 48 by a generally concave spherical portion of the mirror 40. The generally planar mirror portion is integrally attached to the generally spherical mirror portion of the mirror 40. The spherical portion reflects the collected light through the optical train 38, the half-silvered mirror 37, and to a sensor means, e.g., a photosensor 50. The photosensor 50, preferably a photodiode, detects the variable intensity of the collected laser light over a field of view which extends along, and preferably beyond, the scan, and generates an electrical analog signal indicative of the detected variable light intensity.

Also mounted in the head is signal processing means 52 mounted on a circuit board 54, and operative for processing the analog electrical signal generated by the photodiode 50 into a digitized video signal. Data descriptive of the symbol can be derived from the video signal. Suitable signal processing circuitry for this purpose was described in U.S. Pat. No. 4,251,798. Other components within the head include drive circuitry for the motor 46, an aiming light controller in the event that the laser diode 32 generates a laser beam which is not readily visible to the human eye, and a voltage converter for converting incoming voltage, e.g. from the battery 34, to a regulated voltage suitable for energizing the laser diode 32.

Also mounted on the circuit board 54 is a decode/control means 56 operative for decoding the digitized video signal to a digitized decoded signal from which the desired data descriptive of the symbol is obtained in accordance with an algorithm contained in a software control program in the microprocessor 30. The decode/control means includes a PROM for holding the control program, and an RAM for temporary data storage. The decode/control means 56, together with the microprocessor, determine when a successful decoding of the symbol has been obtained, and also terminates the reading of the symbol upon the determination of the successful decoding thereof. The initiation of the reading is caused by depression of the trigger 28. The decode/control means also includes control circuitry for controlling the actuation of the actuatable components in the head, namely, the laser diode 32, the photodiode 50, the motor 46, and all the other electronic subcircuits therein, as initiated by the trigger, as well as for communicating with the user that the reading has been automatically terminated as, for example, by sending a control signal to an indicator lamp 58 to illuminate the same or by energizing a buzzer or beeper.

The decoded signal is either conducted along a conductor within a cable interconnected between the head and a remote host computer 60, or is transmitted by radio wave from the head to the computer 60 by means of antenna 36. The computer 60 serves essentially as a large data base, may be an in-store processor, stores the decoded signal, and provides information related to the decoded signal. For example, the host computer, in accordance with this invention, can provide retail price information on an updated basis corresponding to the products identified by their decoded symbols. The host computer can advantageously be incorporated in a portable terminal, or in a stationary terminal such as a cash register.

A keyboard 62 may advantageously be provided on the head for entering data relating to the symbol and/or the product bearing the same. A display 64 is also conveniently mounted adjacent the keyboard 62 on the top wall 20 of the head, and is operative for displaying information relating to the symbol and/or the product bearing the same.

As described so far, each product bearing a label imprinted with a symbol is identified by scanning the symbol with the hand-held scanner head 10 in the manner depicted in FIG. 2. Information such as price is retrieved on a real-time basis from the data base of the host computer 60. The stored information is periodically updated, for example, by keyboard entry, to reflect price increases or decreases. The data base can be incorporated in a portable housing held in one's other hand, or supported on the operator's person, for example, suspended from a belt or shoulder strap, in a field-portable application.

In the event that the information stored in the data base has been updated, this invention proposes printing an updated label with machine-readable and/or human-readable data reflecting the updated information. The printing is performed by a printer 62 that is either incorporated in the hand-held head 10 (see FIG. 1) or held in one's other hand, or worn on one's person (see FIG. 2), or mounted on a near-by support surface such as a countertop, or incorporated in another component such as a scale or cash register, as described below. The printer includes a thermal printhead 61 operative for thermally imprinting graphical markings on a journaled roll 63 of paper labels, each printed label being torn off the roll by being urged against tear-off edge 65 at the front of the head 10. The updated label preferably has a pressure-adhesive backing so that it can be applied directly on the product, either adjacent to, or preferably as an overlay to, the existing label on the product.

Figure 3:
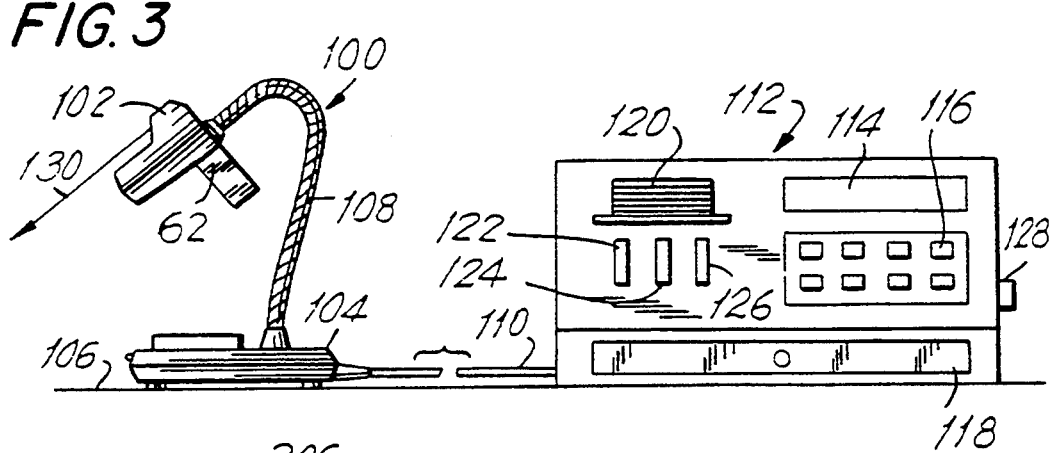
FIG. 3 is a diagrammatic side view of another arrangement for updating inventory markings according to this invention.

Turning now to FIG. 3, most or all of the components shown within the hand-held head 10 of FIG. 1 can be mounted within a workstation 100 having a head 102, a base 104 supported on a countertop or like support surface 106, and an adjustable gooseneck-like conduit or arm 108, one end of which is connected to the head 102, and the opposite end of which is connected to the base 104. The trigger 28 can be eliminated. The arm 108 is hollow so that electrical wires can be routed therethrough to conduct electrical signals to and away from the components within the head 102. The arm is constituted of a semi-rigid, metal material capable of being repeatedly manually bent to a selected orientation and, when so bent, capable of staying in said selected orientation until re-bent by an operator to another orientation. By bending the arm, the head 102 is infinitely adjustably positioned relative to a symbol located in the vicinity of a work surface exteriorly of the scanner. The work surface or reference plane can be located at, or slightly above, the plane of the countertop 106, or can be located at, or slightly above, the plane of the upper surface of the base 104.

An electrical cable 110 connects the workstation to a terminal 112 which is shown, for convenience, as a cash register in a POS installation. The terminal 112 has a display 114 for displaying information, including data descriptive of the symbol being scanned, to an operator; a keyboard 116 for enabling the operator to manually enter information, including data descriptive of the symbol being scanned; a cash drawer 118 for holding money; a paper tape 120 for recording information and providing a receipt to a customer of the purchase of an object bearing the symbol being scanned; a recharger 122 for recharging and supplying electrical power to a battery mounted either within the base 104 or the head 102; a decode module 124 (in case the decode module is not located within the base 104, arm 108, or head 102); and a data base 126 of a host computer. A connector 128 can be used to download the stored data to another data base.

The entire installation shown in FIG. 3 is known as an intelligent terminal. The arm 108 can be manipulated with multiple degrees of freedom of movement to insure that the exiting laser beam (depicted by the arrow 130) strikes the symbol and/or the returning reflected light is collected from the symbol.

The laser scanning head 100 of FIG. 3 is of the retro-reflective type wherein the outgoing incident laser beam, as well as the field of view of the sensor means, are scanned. It will be readily understood that other variants also are within the spirit of this invention. For example, the outgoing incident laser beam can be directed to, and swept across, the symbol through one window on the head, while the field of view is not scanned and the returning laser light is collected through another window on the head. Also, the outgoing incident beam can be directed to, but not swept across, the symbol, while the field of view is scanned.

The printer 62 can be incorporated within the head. As shown in FIG. 3, the printer 62 is situated within a downward handle-like extension of the head. Any components previously mounted within the handle can be moved, for example, to the base 104 or the terminal 112.

Figure 4:
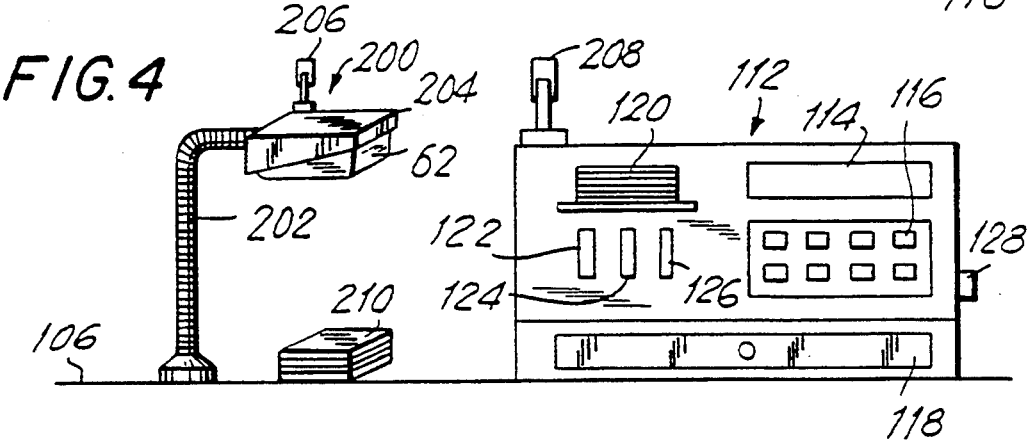
FIG. 4 is a diagrammatic side view of yet another arrangement for updating inventory markings according to this invention.

Turning now to the so-called "zero footprint" embodiment of FIG. 4, most or all of the components within the hand-held head of FIG. 1 can be mounted within a lamp-like workstation 200 having a bendable arm 202 and a head 204 in which the printer 62 is mounted. The workstation is anchored to the support surface 106. The head can communicate with the terminal 112, for example, by radio wave communication, via antennae 206, 208. The workstation 200 can scan bulky or small objects, such as delicatessen sandwich 210, and its slim, compact design clears valuable point-of-sale counter space, leaving more room for customers to put down their purchases and giving employees more room to work.

Figure 5:
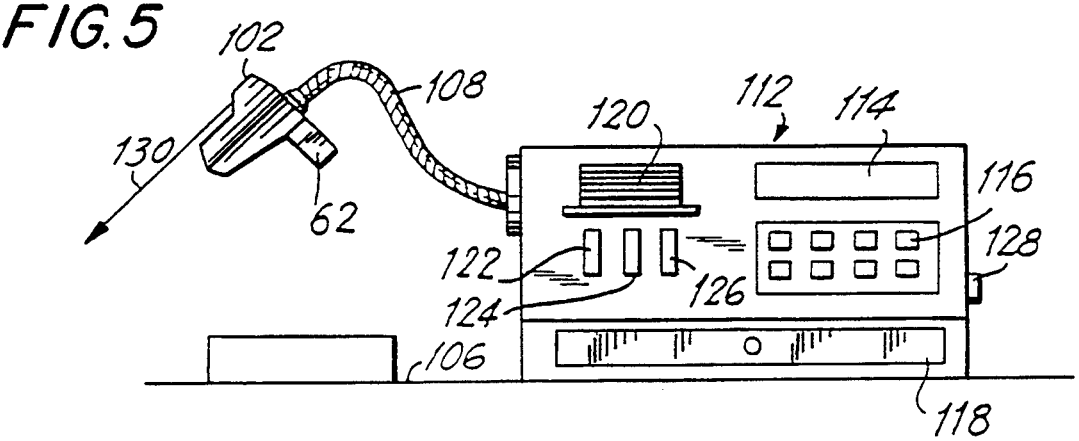
FIG. 5 is a diagrammatic side view of an additional arrangement for updating inventory markings according to this invention.

In the embodiment of FIG. 5, the bendable arm 108 and the head 102, including the printer 62, are neither anchored to the base 104 nor the support surface 106, but, instead, are directly connected to the cash register terminal 112.

As described in the embodiments of FIGS. 3–5, the bendable arm 108,202 enables the operator to specifically position the scanner head over the working surface so that the distance between the head and the products bearing the symbols to be scanned may be optimally adjusted. In practice, the operator will pass the articles bearing symbols to be scanned in a fairly rapid manner under the scanning head. The head will emit a laser beam scan pattern which covers the entire portion of the working surface so that the operator need not repetitively pass the article over a specific area such as an X-shaped slot formed in a countertop. Known slot-type scanners often require multiple passes of the article and symbol over a countertop slot in order to achieve an accurate registration of the symbol with respect to the scan pattern. Since the scan pattern in the present invention is, advantageously, a multi-directional pattern of the type described in U.S. Ser. No. 392,207, filed Aug. 10, 1989, there is a much higher probability that one of the scan lines will extend across the symbol regardless of the orientation of the article on the working surface.

Another feature of the present invention is known as the automatic object sensing feature. Since the scanner workstation of FIGS. 3–5 is intended to operate in a hands-free mode, it is important in the design of the present invention that the scanning take place continuously. When a bar code symbol is detected in the workstation, typically by interruption of an infrared beam, and correctly decoded, the data representative of the symbol is automatically entered into the POS terminal, and an indicator alerts the operator that a successful read has occurred. Although the scan lines will still continue to scan the bar code symbol on the article while the article is in the workstation, an inhibiting signal is generated after a successful read to prevent the same symbol from being read a multiple number of times.

Figure 6:
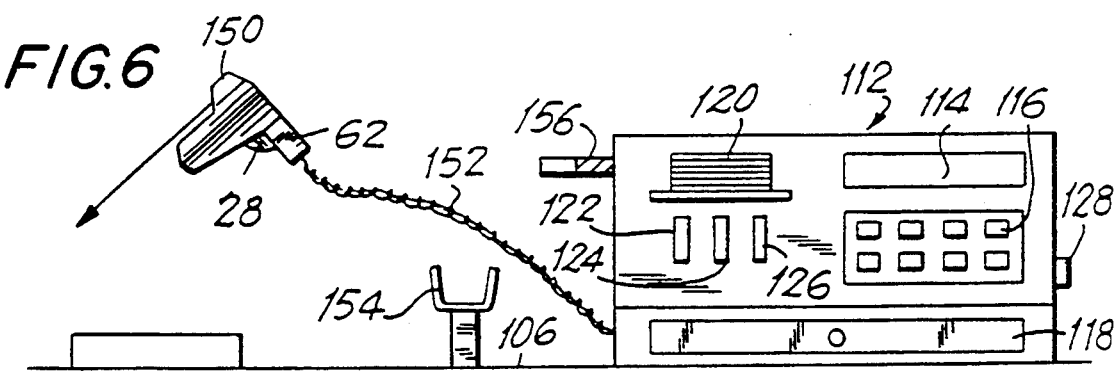
FIG. 6 is a diagrammatic side view of a further arrangement for updating inventory markings according to this invention.

Turning now to FIG. 6, a hand-held head 150 having an on-board printer 62, and actuatable, just like head 10, by a trigger 28, is connected via a cable 152 to the cash register terminal 112. The head 150 may be held in one's hand and/or mounted in a stand 154 resting on the tabletop 106, or may be mounted, at least temporarily, in a cradle 156 extending outwardly from the side of the terminal 112.

Figure 7:
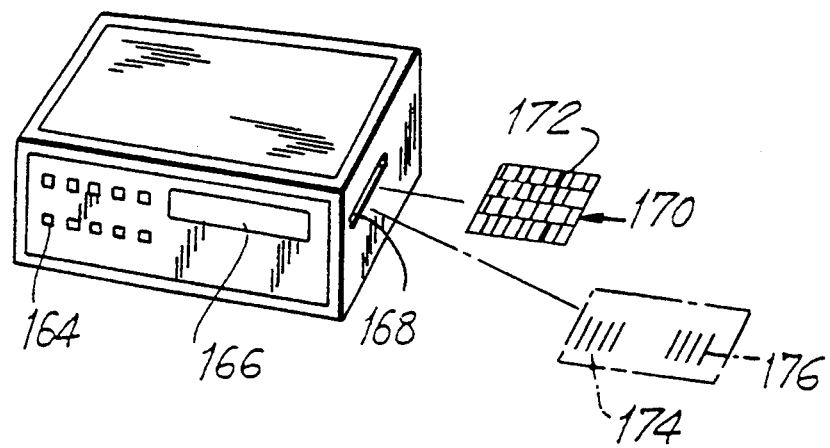
FIG. 7 is a perspective view of a combination printer for use with this invention.

An integrated housing as shown in FIG. 7 includes a keyboard 164, a display 166, and a slot 168 through which updated labels 170 issue. An internal printing mechanism, which is driven preferably by a bar code symbol input, prints the data 172 on each label 170. The data may be encoded as a one-dimensional bar code symbol, e.g., a UPC symbol, or as a two-dimensional or multi-track bar code symbol as shown for label 170. Reference may be had to U.S.L.P. No. 4,794,239 for details of multi-track bar code symbols used for greater spatial efficiency.

The data 172 may be just price-related information, or, as shown for label 174, may include additional coded information 176, such as a sequence number, indicative of the cumulative number of times that the printer has printed a label. Thus, the total number of labels printed can be tracked to assist in preventing pilferage.

Each head or workstation described herein is preferably operative in three modes or operational states. The first, or so-called "sleep" mode, is an inactive state. The second, or so-called "aiming" mode, emits a pointing or aiming light beam to assist the operator in correctly orienting the product label. The aiming light beam can be a circular or elliptical beam spot, or a short linear sweep on the symbol. The third, or so-called "scanning" mode, emits a light beam which scans and reads the entire symbol.

Figure 8:
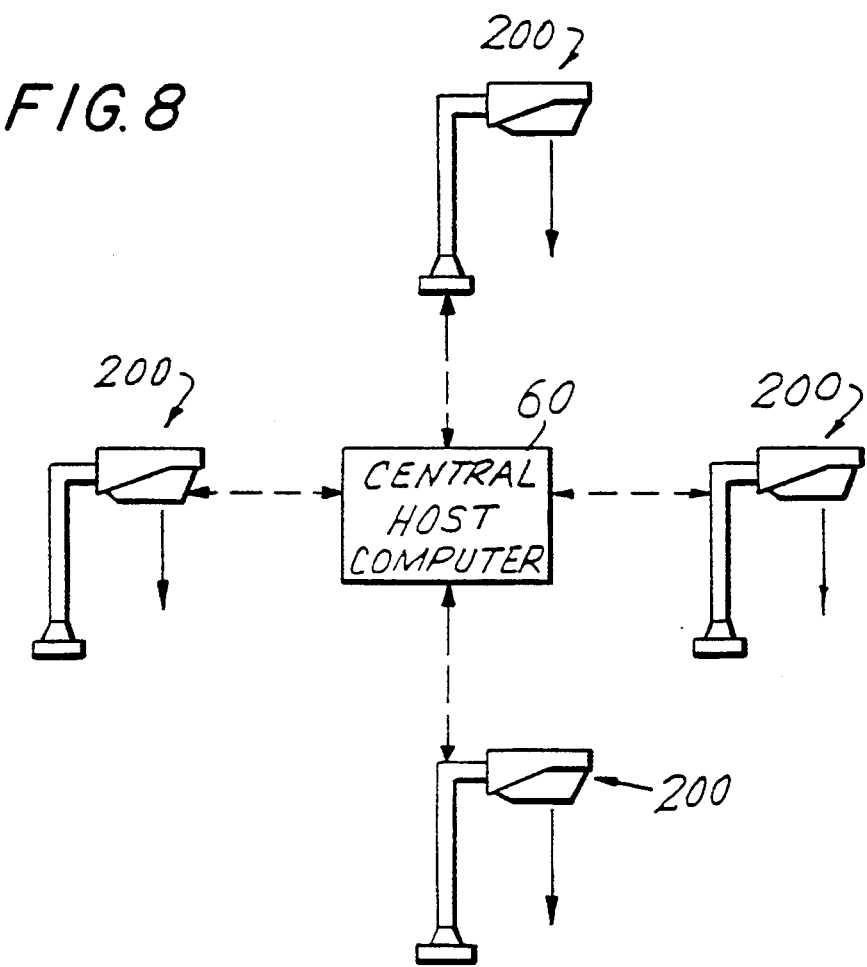
FIG. 8 is a block diagram showing a host computer serving multiple scanning workstations.

As shown in FIG. 8, the host computer 60 can serve multiple heads or workstations such as workstations 200. Each workstation is independently operable to scan a product label, print an updated label, and enable an operator to apply the printed label on a product in a so-called "scan-print-apply" operation.

It is further advantageous if the aforementioned decode/control means 56, as well as all the other components in the head or workstation, are mounted on a single circuit board such as board 54. A number of things then become possible that are advantageous both during manufacturing and in use in the field. For example, the microprocessor 30 can control functions that otherwise might not be possible, or might require expensive hardware.

During manufacture of the head or workstation, for example, the microprocessor 30 could control such things as motor scan amplitude (or scan speed) and laser power. This would permit automatic adjustment of these settings to the proper levels, when placed in a fixture that can provide feedback to the scanner so that it will know when the settings are correct. This eliminates expensive and time-consuming human labor, and increases product reliability and consistency by eliminating human error.

With the microprocessor in control, scanning performance can be improved. Such things as gain of the analog amplifiers, motor speed, and digitizing thresholds can be varied by the microprocessor to help decode difficult-to-read symbols.

Some of these things can be varied with the decode/control means remote from the scanner, but it will increase the number of interconnections between the scanner and decode/control means which increases size and cost of interconnecting cables and connectors.

Other adjustments, such as laser power or motor speed, which are automatically set during manufacturing, require that the decode/control means and scanner be on one board, as the decoder will have learned the proper settings for its particular scanner, and so must never be connected to another scanner.

The decode/control means can control such functions by using digital-to-analog converters, digitally-controlled potentiometers or attenuators, analog switches, or whatever is appropriate for the function being controlled. Proper settings that are determined during manufacturing can be stored in non-volatile memory in the microprocessor so they can be restored each time the scanner is powered up.

Figure 9:
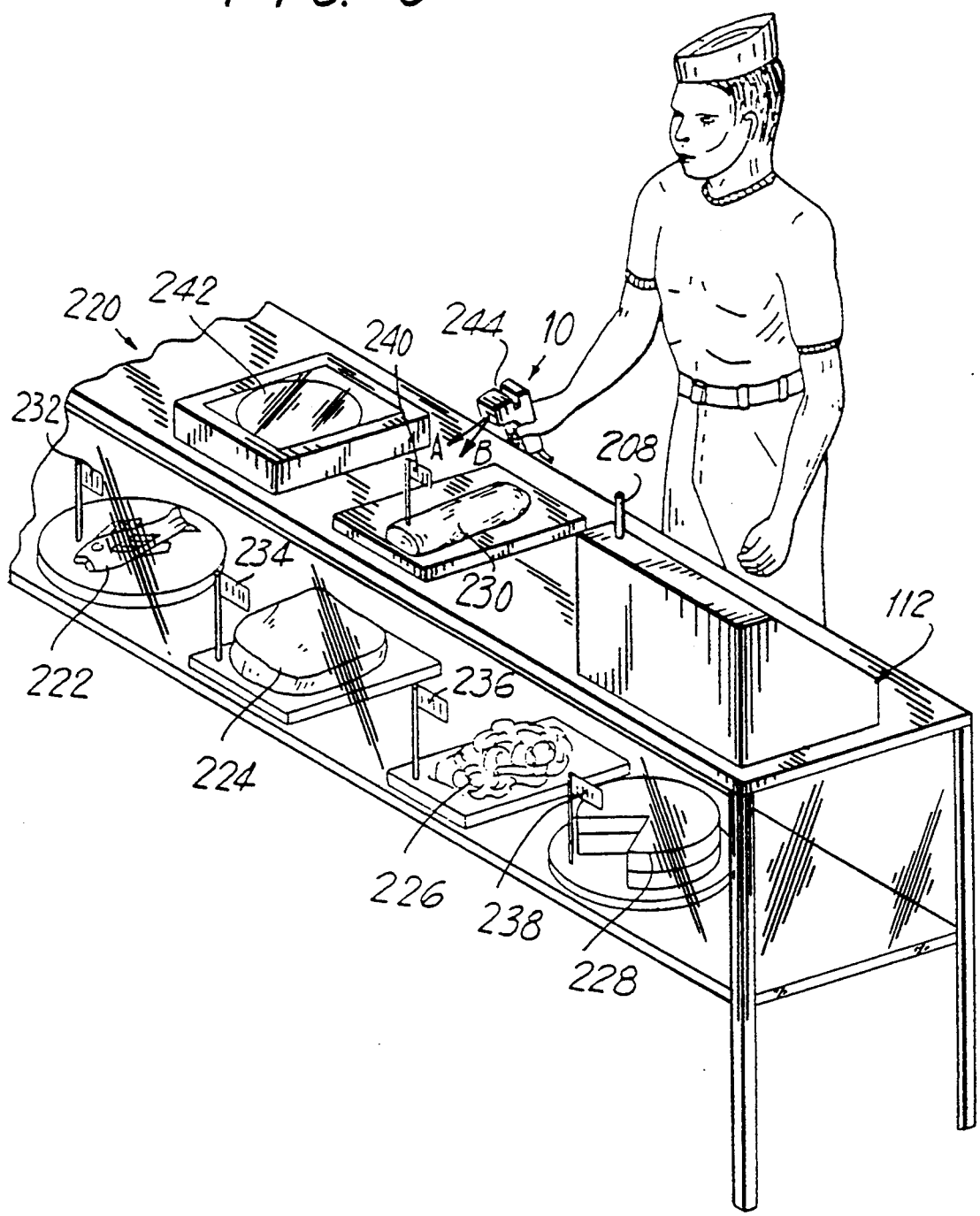
FIG. 9 is a front perspective-view of an arrangement according to this invention in use at a retail point-of-sale location.

Turning now to FIG. 9, a point-of-sale counter 220, such as an appetizing counter, has a plurality of appetizing products such as fish 222, meat 224, potato salad 226, cheese 228, salami 230, just to mention a few exemplary choices. Each product is associated uniquely with a bar code symbol. For example, flags 232, 234, 236, 238, 240 bear unique coded symbols which, when electro-optically scanned, decoded and read, respectively identify the products 222., 224, 226, 228, 230.

The counter 220 also includes a cash register 112 of the type shown, for example, in FIG. 4 and having an antenna 208, as well as a combination printer of the type shown in FIG. 7. A clerk stands behind the counter 220 and holds a scanner 10 of the type shown in FIG. 1.

In use, a customer walks up to the counter 220 and requests a portion 242 of a particular product, such as salami 230. The clerk aims the scanner 10 at the flag 240 to advise the system that the product is, in fact, salami. It is this optical identification of the product which prevents operator error as is common with manual entry of product identification codes in known systems.

With the product, the price information is determined, and a label such as label 170, 174 is printed, as described above. The label is applied to the salami portion 242, typically on a paper wrapping therefor.

In a modification, the scanner 10 is provided with a slot 244 through which magnetically encoded credit cards are passed for the purpose of charging the customer's account, all at one location.

This invention is not intended to be limited to food counters, since any merchandise can be optically read in the manner described above. In a retail situation such as a clothing store, the scanner 10 could additionally be provided with a tag deactivator of the type described in Ser. No. 236,249, filed 08/25/88, now abandoned.

Inventory control is tightened with the arrangement described herein. Typically, the in-store processor (host computer) assigns a serial number to the product portion 242. The processor then adds this information to the point-of-sale product file with the correct price. Once the product portion is scanned, the serial number is deleted from the product file.

The printing of a symbol is performed by a printer that is either incorporated in a hand-held head, or held in one's other hand, or worn on one's person, or mounted on a nearby support surface such as a countertop, or incorporated in another component such as a scale or cash register, as described above. The printer advantageously includes a thermal printhead operative for thermally imprinting graphical markings on a journaled roll of paper labels, each printed label being torn off the roll by being urged against a tear-off edge at the front of the printhead. The label preferably has a pressure-adhesive backing so that it can be applied directly on the product or packaging therefor.

Figure 10:
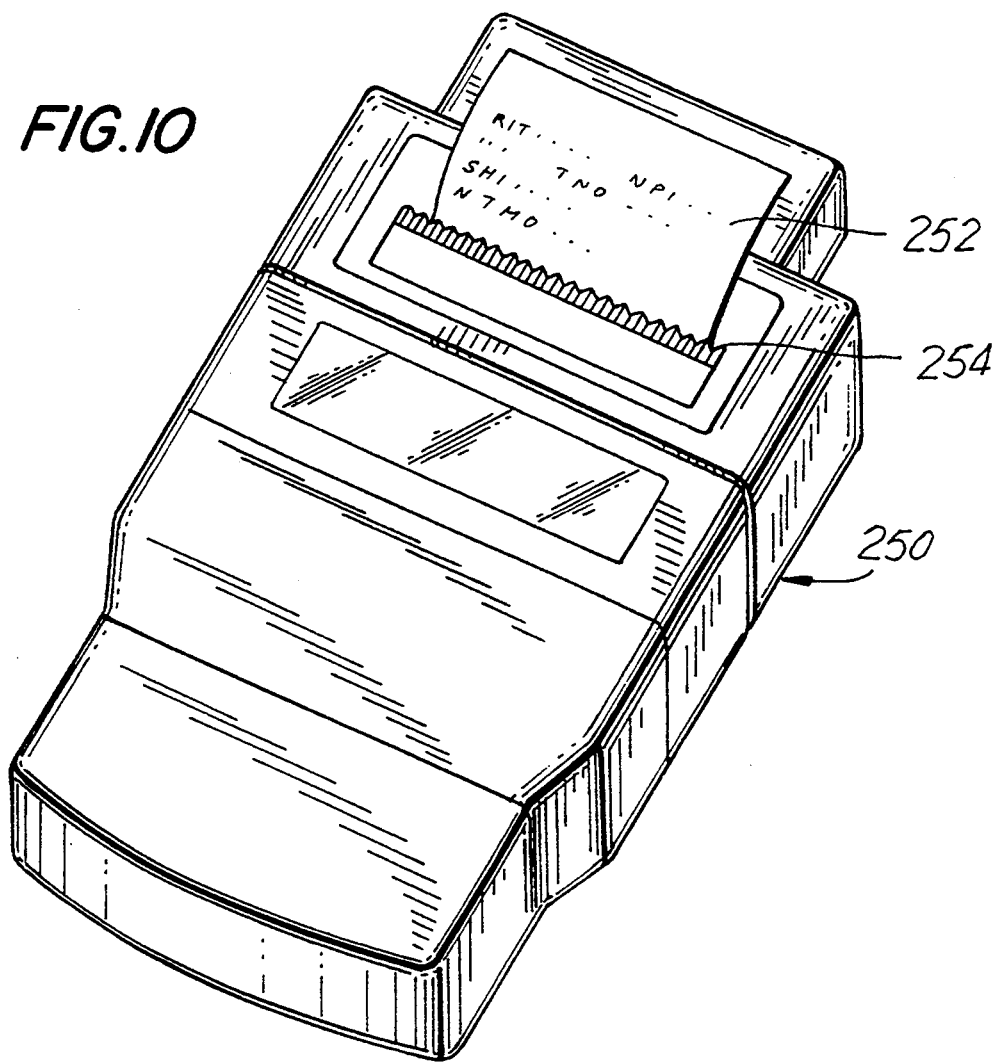
FIG. 10 is a front perspective view of a printer for use with this invention.
Figure 11:
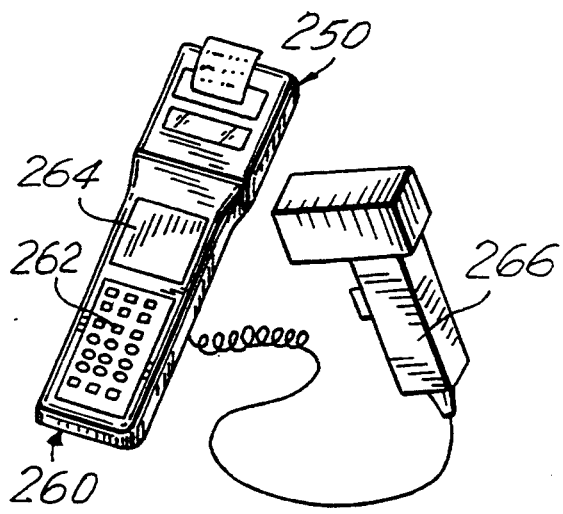
FIG. 11 is a front perspective view of the printer of FIG. 10 connected to a portable data terminal.
Figure 12:
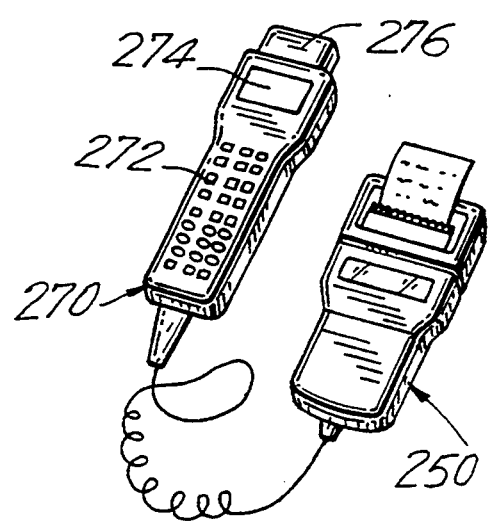
FIG. 12 is a front perspective view of the printer of FIG. 10 connected to a scanner.

FIG. 10 illustrates a printer 250 for printing transaction receipts. The printer 250 includes a thermal printhead for imprinting graphical markings on a paper roll 252, each receipt being torn off the roll by being urged against a tear-off edge 254. Printer 250 may be used as a stand-alone printer, or can be carried in one's hand, or on one's person in a holster, or as shown in FIGS. 11 and 12, can be connected to a portable data terminal. The printer 250 may be provided with or without a magnetic stripe reader, can print on single-or two-ply plain paper, and includes an internal paper advance button for loading, as well as a single-line paper advance button. Other features include a low battery warning light and a battery charging light.

FIG. 11 illustrates an alternative printer/scanner arrangement which can be used with the present invention. The arrangement comprises a portable data terminal 260 having a keyboard 262 for data entry, and a screen 264. Attached to the portable data terminal are the integrated printer 250 and a separate bar code reader 266 which is tethered to the terminal.

An alternative printer/scanner arrangement is shown in FIG. 12. As before, this comprises a portable data terminal 270 having a keyboard 272 and a screen 274. However, in this case the terminal incorporates an integral scanner head 276. Tethered to the terminal is the printer 250.

It will be understood that each of the elements described above, or two or more together, also may find a useful application in other types of constructions differing from the types described above, While the invention has been illustrated and described as embodied in an arrangement for and method of updating inventory markings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of labelling different products having different attributes with an integrated reader/printer unit, comprising the steps of:
   (a) storing product identity information and data corresponding to the attributes of each product in a common data base of a host computer;
   (b) situating a tag bearing coded indicia having parts of different light reflectivity adjacent to each of the products, each coded indicia representing the identity of a respective product;
   (c) electro-optically scanning and reading the coded indicia on the tag situated with a product visually selected by a human operator by moving the unit relative to, and at a distance away from, the coded indicia to position thereon a light beam emitted exteriorly of the unit and movable across the coded indicia to automatically identify the product selected by the operator to the host computer on a real-time basis;
   (d) accessing on a real-time basis the data base in response to the reading step to automatically retrieve the stored data corresponding to the attributes of the product selected;
   (e) printing a bar code symbol representing the retrieved data on a label with the unit;
   (f) applying the printed label to the product selected; and
   (g) automatically reading the symbol on the printed label applied to the product selected to be automatically read at a point-of-transaction terminal to complete a commercial transaction.

2. The method according to claim 1, wherein the printing step is performed by also printing sequential coded data indicative of the total number of labels printed.

3. The method according to claim 1, wherein the data is a base price; and further comprising the step of periodically changing the base price of a product whose price has changed and storing the changed price in the data base; and wherein the printing step is performed by selectively printing the changed price on the label only if the base price of the product has been changed.

4. The method according to claim 1, wherein the reading, printing and applying steps are performed at a sales counter remote from the point-of-transaction terminal.

5. The method according to claim 1, wherein a surface of each product bears original indicia, and wherein the applying step is performed by applying the printed label over the original indicia so as to obscure the original indicia from being read, thereby updating the attributes of each product.

6. The method according to claim 1, wherein a surface of each product bears original indicia, and wherein the applying step is performed by applying the printed label adjacent the original indicia so that both the original indicia and the symbol on the printed label may be read.

7. An arrangement for expediting commercial transactions of products at a point-of-transaction terminal, comprising:
   (a) a computer having a data base in which product identity information and data corresponding to attributes of each product are stored;
   (b) a tag bearing coded indicia having parts of different light reflectivity situated adjacent to each of the products, each coded indicia representing the identity of a respective product;
   (c) means for electro-optically scanning and reading the coded indicia on the tag situated with a product visually selected by a human operator, including means for directing a light beam exteriorly of the reading means, and means for movably positioning the light beam on the coded indicia on the tag of the selected product to automatically identify the selected product to the host computer and produce a signal when such identification is successfully made;
   (d) means for accessing the data base on a real-time basis in automatic response to said signal from the reading means to retrieve the stored data corresponding to an attribute associated with each identified product;
   (e) means for printing attribute information corresponding to the retrieved data on a label for each identified product on a real-time basis with the operation of the means for accessing the data base;
   (f) adhesive means for adhering the printed label to each identified product; and
   (g) means for completing a commercial transaction at the point-of-transaction terminal by electro-optically reading the attribute information on the printed label on a product presented to the point-of-transaction terminal.

8. The arrangement according to claim 7, wherein the data is a base price; and further comprising means for periodically changing the base price of a product whose price has changed and storing the changed price in the data base; and wherein the printing means selectively prints the changed price on the label only if the base price of the product has been changed.

9. The arrangement according to claim 7, wherein the reading, printing and applying means are located at a sales counter remote from the point-of-transaction terminal.

10. The arrangement according to claim 7; and further comprising receipt means for printing a receipt evidencing the commercial transaction.

11. The arrangement according to claim 10, wherein the receipt means includes a printhead for imprinting graphical markings on a paper roll.

12. The arrangement according to claim 11, wherein the printhead has a tear-off edge.

13. The arrangement according to claim 11, wherein the printhead is connected to a portable data terminal.

14. The arrangement according to claim 13, wherein the terminal has a keyboard and a display.

15. The arrangement according to claim 11, wherein the printhead is connected to the scanning means.

* * * * *